(12) United States Patent
Bradford et al.

(10) Patent No.: US 11,119,213 B2
(45) Date of Patent: Sep. 14, 2021

(54) METHOD FOR GENERATING A LINEAR CHIRP FROM A LASER LIGHT SOURCE

(71) Applicant: Aeva, Inc., Mountain View, CA (US)

(72) Inventors: Bryce Bradford, Cupertino, CA (US); Mina Rezk, Haymarket, VA (US)

(73) Assignee: Aeva, Inc., Mountain View, CA (US)

( * ) Notice: Subject to any disclaimer, the term of this patent is extended or adjusted under 35 U.S.C. 154(b) by 449 days.

(21) Appl. No.: 16/287,687

(22) Filed: Feb. 27, 2019

(65) Prior Publication Data

US 2020/0271784 A1    Aug. 27, 2020

(51) Int. Cl.
| | |
|---|---|
| *G01C 3/08* | (2006.01) |
| *G01S 17/26* | (2020.01) |
| *G01S 17/88* | (2006.01) |
| *G01S 7/48* | (2006.01) |
| *G01B 9/02* | (2006.01) |
| *G01S 7/486* | (2020.01) |
| *G01S 7/499* | (2006.01) |

(52) U.S. Cl.
CPC .......... *G01S 17/26* (2020.01); *G01B 9/02015* (2013.01); *G01B 9/02075* (2013.01); *G01B 9/02092* (2013.01); *G01S 7/486* (2013.01); *G01S 7/4808* (2013.01); *G01S 7/499* (2013.01); *G01S 17/88* (2013.01)

(58) Field of Classification Search
None
See application file for complete search history.

(56) References Cited

U.S. PATENT DOCUMENTS

| | | | |
|---|---|---|---|
| 8,175,126 B2 * | 5/2012 | Rakuljic | G01S 7/4911 372/20 |
| 8,913,636 B2 † | 12/2014 | Roos | |
| 2010/0085992 A1 † | 4/2010 | Rakuljic et al. | |

FOREIGN PATENT DOCUMENTS

| | | | | | |
|---|---|---|---|---|---|
| CN | 111048980 A | * | 4/2020 | ......... | H01S 3/10023 |
| WO | WO2019121069 A1 | * | 6/2019 | ............. | G01S 17/34 |

OTHER PUBLICATIONS

Baghmisheh, "Chip-scale Lidar", Electrical Engineering and Computer Sciences, University of California at Berkeley, Technical Report No. UCB/EECS-2017-4, https://www2.eecs.berkeley.edu/Pubs/TechRpts/2017/EECS-2017-4.html, Jan. 19, 2017, 46 pages.
Vasilyev, "The Optoelectronic Swept-Frequency Laser and Its Applications in Ranging, Three-Dimensional Imaging, and Coherent Beam Combining of Chirped-Seed Amplifiers", California Institute of Technology, Pasadena, CA, https://thesis.library.caltech.edu/7820/1/Arseny_Vasilyev_Thesis_CompleteThesis.pdf, May 20, 2013, 177 pages.

* cited by examiner
† cited by third party

*Primary Examiner* — Mark Hellner
(74) *Attorney, Agent, or Firm* — Womble Bond Dickinson (US) LLP

(57) ABSTRACT

An electro-optical system has a laser drive electronic circuit, a laser light source and an optical interferometer, forming a closed loop. The laser drive electronic circuit is arranged to receive a reference frequency as input, and a beat frequency as feedback. The laser drive electronic circuit generates a drive output based on a phase difference between the reference frequency and the beat frequency. The optical interferometer, coupled to the laser light, generates optical energy at the beat frequency.

17 Claims, 11 Drawing Sheets

METHOD FOR GENERATING A LINEAR CHIRP FROM A LASER LIGHT SOURCE

TECHNICAL FIELD

The present disclosure relates generally to light detection and ranging (LIDAR) that provides simultaneous measurement of range and velocity across two dimensions. The present disclosure further relates to electro-optical systems and controlling light frequency of a laser light source.

BACKGROUND

Detecting time of flight for a laser light pulse in a LIDAR system works well in isolation but not as well in real-world automotive environments where multiple LIDAR systems may be present and undesirably interact with one another. Light detection sensors operate in a light frequency range and may pick up laser light pulses from other LIDAR systems in operation nearby and produce erroneous readings that then get interpreted incorrectly. Sunlight reflecting or dispersing off of stationary and moving objects produces some light in any given frequency range, and may be picked up by a LIDAR system. Attempting to control light frequency of a laser light source, to solve these problems and improve upon time of flight LIDAR systems, introduces its own set of problems, such as laser light frequency drift, and difficulty of obtaining linearity of control and laser light source response.

SUMMARY

The present disclosure includes, without limitation, the following example implementations.

Some example implementations provide an electro-optical system. The electro-optical system has a laser drive electronic circuit, a light source and an optical interferometer. The laser drive electronic circuit is arranged to receive a reference frequency as input and a beat frequency as feedback. The laser drive electronic circuit generates a drive output based on a phase difference between the reference frequency and the beat frequency. The laser light source is arranged to receive the drive output and generate laser light. The optical interferometer is coupled to the laser light to generate optical energy at the beat frequency. The beat frequency is proportional to the rate of frequency change of the laser light. The laser drive electronic circuit, the laser light source and the optical interferometer with the feedback form a closed loop.

Some example implementations provide an electro-optical system for generating a linear phase chirp from a laser light source. The electro-optical system has a laser light source, an optical interferometer, a photodetector, and laser drive electronic circuit. The laser light source is arranged to receive a laser light drive and generate laser light. The optical interferometer is arranged to receive a portion of the laser light and generate optical energy at a beat frequency. The beat frequency is proportional to laser light frequency rate of change. The photodetector is arranged to receive at least a portion of the optical energy at the beat frequency. The photodetector generates a signal that indicates the beat frequency. The laser drive electronic circuit is arranged to receive a reference frequency as input. The laser drive electronic circuit is arranged to receive the signal that indicates the beat frequency as closed loop feedback. The laser drive electronic circuit is arranged to compare the beat frequency with reference frequency and generate the laser light drive so as to correct the laser light drive to keep the beat frequency locked to the reference frequency.

Some example implementations provide a method of generating a linear phase chirp from a laser light source. Laser light is produced from a laser light source. Optical energy at a beat frequency proportional to a frequency rate of change of the laser light is produced from an optical interferometer. The beat frequency and a reference frequency are compared. A laser light drive output is produced, based on the comparing. The laser light drive output drives the laser light source to keep the beat frequency locked to the reference frequency.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects, and advantages will become apparent from the following detailed description taken in conjunction with the accompanying figures which illustrate, by way of example, the principles of some described example implementations.

BRIEF DESCRIPTION OF THE FIGURE(S)

Embodiments and implementations of the present disclosure will be understood more fully from the detailed description given below and from the accompanying drawings of various aspects and implementations of the disclosure, which, however, should not be taken to limit the disclosure to the specific embodiments or implementations, but are for explanation and understanding only.

DETAILED DESCRIPTION

Figure 1:
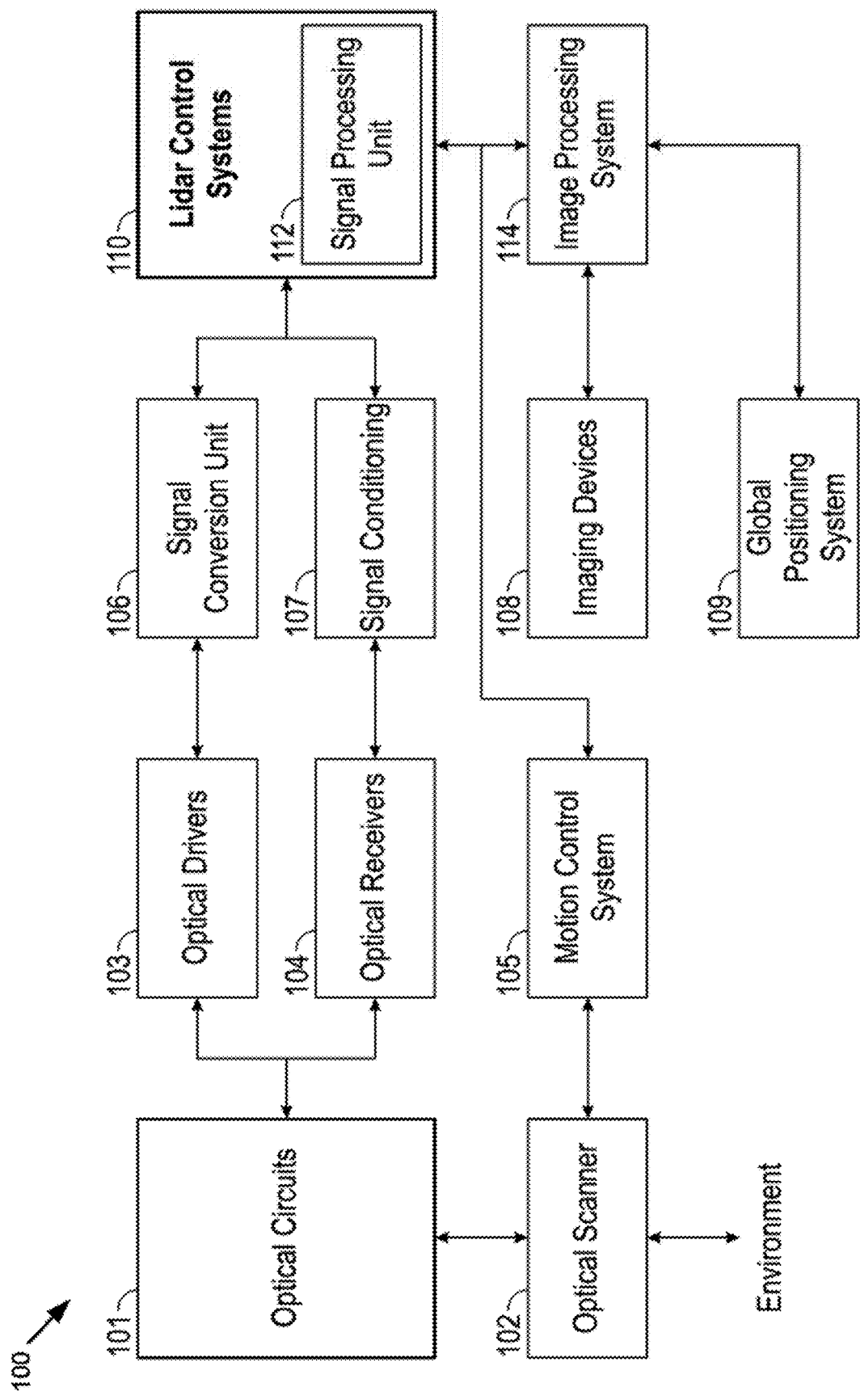
FIG. 1 illustrates a LIDAR system according to example implementations of the present disclosure.

Example implementations of the present disclosure are directed to a closed loop electro-optical system that generates a linear chirp from a laser light source for use in an improved scanning LIDAR system. Example implementations of the present disclosure are based on a type of LIDAR that uses frequency modulation (FM) and coherent detection to overcome the shortcomings of traditional LIDAR systems and the limitations of prior FM LIDAR systems.

Traditional methods for normalizing chirps from a laser light source require several iterations and are prone to errors under varying environmental conditions. The traditional method is slow and non-linear. This disclosure describes a method and related electro-optical system for generating a linear chirp from a laser light source. This method uses an efficient closed loop feedback system to generate a linear chirp from the laser light source by locking the self-homodyne mixed beat frequency to an external reference frequency.

The electro-optical system generates a linear chirp from the laser light source by locking the self-homodyne mixed beat frequency to an external reference frequency. The closed loop feedback system allows the system to correct the beat frequency based on the reference frequency. The reference frequency can be modified according to the application requirements. Various embodiments have some or all of the following features.

A linear chirp based on a phase locked loop (PLL) control loop circuit ensures linearity even when operating conditions change. In the phase locked loop, a beat frequency based on laser light source rate of frequency change is compared to a reference frequency, to drive the laser light source.

Dynamic control of chirp ramp rate is available through control of the reference frequency. Since the beat frequency is locked to the reference frequency through the phase locked loop, when the reference frequency input to the phase locked loop is varied, the ramp rate of change of laser light source frequency varies likewise.

Front to back differential architecture is used in various embodiments of linear circuits) in the laser drive electronic circuit. Benefits of differential signaling in various stages (see FIG. 3), including better noise immunity and robustness against DC drift as compared to single ended designs, apply throughout the closed loop electro-optical system.

An alternating current (AC) coupled, fully differential, multiple input transconductance or gm stage supports signals to improve startup and/or polarity switching of the ramp of laser light source frequency.

Independent AC signal and direct current (DC) bias laser driving circuits support independent high-speed, low current AC control and low speed, high current DC bias of the laser light source.

Most traditional methods for generating linear chirp based on a static current ramp profile are highly susceptible to changes in operating conditions. Typically, the gm stage is DC coupled, single-ended, and single input. Most of the traditional methods also use a single transistor combining high speed and low speed control.

The electro-optical system is comprised of laser drive electronics, a laser light source, an optical interferometer to perform self-homodyne mixing of the laser light, and electronics to measure the laser light intensity from the interferometer. In this configuration, the self-homodyne mixed light intensity beats as a function of the laser light source rate of frequency change. By configuring the electrical and optical circuit into a closed loop feedback system, it is possible generate a linear chirp from the laser light source by locking the self-homodyne mixed beat frequency to an external reference frequency.

Example implementations of the present disclosure are configured to simultaneously measure the range and velocity in some embodiments, using the linear chirp from the laser light source along with coherent detection, and having the added benefit of immunity to crosstalk from other LIDAR systems. Other implementations may be used with coherent systems to improve range, framerate, or detection. Additionally, by using nondegenerate laser sources, example implementations can leverage mature wavelength division multiplexing (WDM) techniques often used in integrated silicon photonics, a desired platform due to its compactness and relative stability in varying environmental conditions.

FIG. 1 illustrates a LIDAR system 100 according to example implementations of the present disclosure. The LIDAR system 100 includes one or more of each of a number of components, but may include fewer or additional components than shown in FIG. 1. The LIDAR system 100 may be implemented in any sensing market, such as, but not limited to, transportation, manufacturing, metrology, medical, and security systems. For example, in the automotive industry, the described beam delivery system becomes the front-end of frequency modulated continuous-wave (FMCW) devices that can assist with spatial awareness for automated driver assist systems, or self-driving vehicles. As shown, the LIDAR system 100 includes optical circuits 101. The optical circuits 101 may include a combination of active optical components and passive optical components. Active optical components may generate, amplify, or detect optical signals and the like. In some examples, the active optical circuit includes lasers at different wavelengths, one or more optical amplifiers, one or more optical detectors, or the like.

Passive optical circuits may include one or more optical fibers to carry optical signals, and route and manipulate optical signals to appropriate input/output ports of the active optical circuit. The passive optical circuits may also include one or more fiber components such as taps, wavelength division multiplexers, splitters/combiners, polarization beam splitters, collimators or the like. In some embodiments, as discussed further below, the passive optical circuits may include components to transform the polarization state and direct received polarized light to optical detectors using a polarization beam splitter (PBS).

An optical scanner 102 includes one or more scanning mirrors that are rotatable along respective orthogonal axes to steer optical signals to scan an environment according to a scanning pattern. For instance, the scanning mirrors may be rotatable by one or more galvanometers. The optical scanner 102 also collects light incident upon any objects in the environment into a return laser beam that is returned to the passive optical circuit component of the optical circuits 101. For example, the return laser beam may be directed to an optical detector by a polarization beam splitter. In addition to the mirrors and galvanometers, the optical scanning system may include components such as a quarter-wave plate, lens, anti-reflective coated window or the like.

To control and support the optical circuits 101 and optical scanner 102, the LIDAR system 100 includes a LIDAR control systems 110. The LIDAR control systems 110 may function as a processing device for the LIDAR system 100. In some embodiments, the LIDAR control system 110 may include signal processing 112 such as a digital signal processor. The LIDAR control systems 110 are configured to output digital control signals to control optical drivers 103. In some embodiments, the digital control signals may be converted to analog signals through signal conversion unit 106. For example, the signal conversion unit 106 may include a digital-to-analog converter. The optical drivers 103 may then provide drive signals to active components of optical circuits 101 to drive optical sources such as lasers and amplifiers. In some embodiments, several optical drivers 103 and signal conversion units 106 may be provided to drive multiple optical sources.

The LIDAR control systems 110 are also configured to output digital control signals for the optical scanner 102. A motion control system 105 may control the galvanometers of the optical scanner 102 based on control signals received from the LIDAR control systems 110. For example, a digital-to-analog converter may convert coordinate routing information from the LIDAR control systems 110 to signals interpretable by the galvanometers in the optical scanner 102. In some embodiments, a motion control system 105 may also return information to the LIDAR control systems 110 about the position or operation of components of the optical scanner 102. For example, an analog-to-digital converter may in turn convert information about the galvanometers' position to a signal interpretable by the LIDAR control systems 110.

The LIDAR control systems 110 are further configured to analyze incoming digital signals. In this regard, the LIDAR system 100 includes optical receivers 104 to measure one or more beams received by optical circuits 101. For example, a reference beam receiver may measure the amplitude of a reference beam from the active optical circuit, and an analog-to-digital converter converts signals from the reference receiver to signals interpretable by the LIDAR control systems 110. Target receivers measure the optical signal that carries information about the range and velocity of a target in the form of a beat frequency, modulated optical signal. The reflected beam may be mixed with a second signal from a local oscillator. The optical receivers 104 may include a high-speed analog-to-digital converter to convert signals from the target receiver to signals interpretable by the LIDAR control systems 110.

In some applications, the LIDAR system 100 may additionally include one or more imaging devices 108 configured to capture images of the environment, a global positioning system 109 configured to provide a geographic location of the system, or other sensor inputs. The LIDAR system 100 may also include an image processing system 114. The image processing system 114 can be configured to receive the images and geographic location, and send the images and location or information related thereto to the LIDAR control system 110 or other systems connected to the LIDAR system 100.

In operation according to some examples, the LIDAR system 100 is configured to use nondegenerate laser sources to simultaneously measure range and velocity across two dimensions. This capability allows for real-time, long range measurements of range, velocity, azimuth, and elevation of the surrounding environment. In some example implementations, the system points multiple modulated laser beams to the same target.

In some examples, the scanning process begins with the optical drivers 103 and LIDAR control system 110. The LIDAR control system 110 instructs the optical drivers 103 to independently modulate one or more lasers, and these modulated signals propagate through the passive optical circuit to the collimator. The collimator directs the light at the optical scanning system that scans the environment over a preprogrammed pattern defined by the motion control subsystem. The optical circuits also include a quarter-wave plate to transform the polarization of the light as it leaves the optical circuits 101. A portion of the polarized light may also be reflected back to the optical circuits 101. For example, lensing or collimating systems may have natural reflective properties or a reflective coating to reflect a portion of the light back to the optical circuits 101.

Optical signals reflected back from the environment pass through the optical circuits 101 to the receivers. Because the light is polarized, it may be reflected by a polarization beam splitter along with the portion of polarized light that was reflected back to the optical circuits 101. Accordingly, rather than returning to the same fiber or waveguide as an optical source, the reflected light is reflected to separate optical receivers. These signals interfere with one another and generate a combined signal. Each beam signal that returns from the target produces a time-shifted waveform. The temporal phase difference between the two waveforms generates a beat frequency measured on the optical receivers (photodetectors). The combined signal can then be reflected to the optical receivers 104. Configuration of optical circuits 101 for polarizing and directing beams to the optical receivers 104 are described further below.

The analog signals from the optical receivers 104 are converted to digital signals using analog-to-digital converters (ADCs). The digital signals are then sent to the LIDAR control systems 110. A signal processing unit 112 may then receive the digital signals and interpret them. In some embodiments, the signal processing unit 112 also receives position data from the motion control system 105 and galvanometer as well as imago data from the image processing system 114. The signal processing unit 112 can then generate a 3D point cloud with information about range and velocity of points in the environment as the optical scanner 102 scans additional points. The signal processing unit 112 can also overlay a 3D point cloud data with the image data to determine velocity and distance of objects in the surrounding area. The system also processes the satellite-based navigation location data to provide a precise global location.

Figure 2:
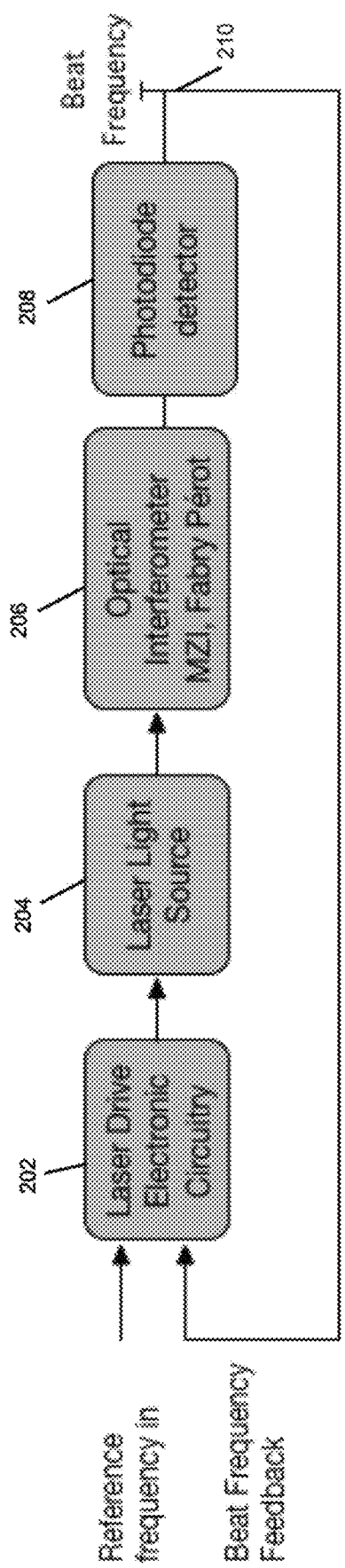
FIG. 2 illustrates a closed loop electro-optical system for generating a linear chirp from a laser light source, in accordance with embodiments of the present disclosure.

FIG. 2 illustrates a closed loop electro-optical system for generating a linear chirp from a laser light source 204, in accordance with embodiments of the present disclosure. Components of the system are described below in table 1, with functions that are modeled and described with reference to FIG. 6.

TABLE 1

Component Level Description

| Component | Function/Purpose | Block Output Type |
|---|---|---|
| Standard PLL Block | Generates a DC Voltage M response to phase error | Single Ended or Differential DC voltage[1] |
| Positive/Negative Chirp Select | Inverts the PLL differential control voltage polarity | Positive or Negative DC voltage |
| Voltage integration Stage | Converts DC input to a ramp output where $\frac{dV_{out}}{dt} = \frac{V_{in}}{RC}$ | Positive or Negative going voltage ramp |
| gm Transconductance Stage | Converts input voltage to output current where $I_{out} = gm \cdot V_{in}$ | Positive or Negative going current ramp |
| Laser Light Source | Converts the input current into laser light | Positive or Negative going light frequency ramp |
| Optical Interferometer | Splits light into two different length paths, and then recombines into a common path | Superposition of the 2 different wavelengths after recombination |
| Light Intensity Measurement | Detects the beat frequency created by the 2 different light frequencies | AC voltage representing the beat frequency |

[1]If the PLL output is single ended it will get converted to differential with the Single ended to differential block.

In operation, a reference frequency is applied to the laser drive electronic circuit 202, and the laser drive electronic circuit 202 (see FIG. 3) powers the laser light source 204 to emit a beam of light into the optical interferometer 206. The interferometer 206 produces an optical energy that beats with a frequency that is proportional to the laser light frequency rate of change.

For example, the interferometer 206 could couple to and split some of the laser light into two optical paths (e.g., fiberoptic paths) of different lengths, then recombine the light from each of the two different length paths to generate the optical energy at the beat frequency. The resulting light intensity is measured by a photodetector 208, and provides a beat frequency 210. In one embodiment, the photodetector 208 is implemented as a photodiode that produces a current proportional to light intensity, followed by a trans-impedance amplifier (TIA) that converts the current signal to a voltage signal.

The beat frequency 210 (e.g., in a signal from the photodetector 208) is fed back to the laser drive electronic circuit 202 and is compared with the reference frequency. According to the difference between the beat and reference frequencies, the laser drive electronic circuit 202 corrects the laser light source drive current to keep the beat frequency 210 locked to the reference frequency. With the laser light frequency rate of change thus locked to the reference frequency, the laser light source produces a linear phase chirp with a locked ramp rate. Changing the reference frequency changes the ramp rate of the laser light linear phase chirp i.e., the ramp rate at which laser light frequency changes.

Figure 3:
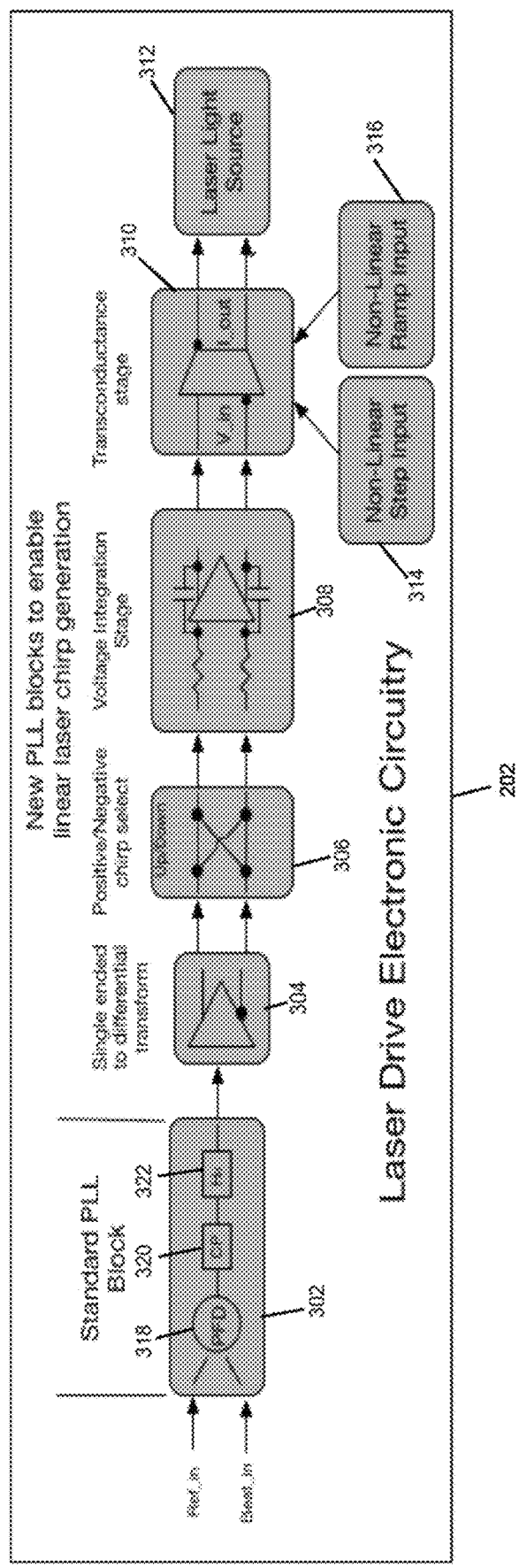
FIG. 3 illustrates laser drive electronic circuit in accordance with embodiments of the present disclosure.

FIG. 3 illustrates laser drive electronic circuit 202 in accordance with embodiments of the present disclosure. The laser drive electronic circuit 202 starts with a common PLL design block 302 of a Phase Frequency Detector 318, Charge Pump 320, and loop filter 322. Generating a linear chirp from a laser source in some embodiments uses additional design blocks such as the chirp direction select switch 306, integrating or integration stage 308, and the transconductance (gm) stage 310 with supplemental non-linear inputs 314, 316 to reduce the loop locking time when the chirp direction is changed. In one embodiment, a non-linear step input 314 and a non-linear ramp input 316 are input to the transconductance stage 310 (see FIG. 4), and further embodiments could have other inputs, types of inputs or numbers of inputs.

The single-ended to differential transform block 304 converts the single ended PLL output into a balanced differential drive signal. Having a balanced differential path provides superior noise and interference rejection compared to single ended designs, and also provides a simple method to reverse the chirp ramp direction by swapping outputs through the chirp direction select switch 306, which reverses the voltage polarity given to the integration stage 308. In practice, the chirp direction continuously alternates between up and down because a control signal cannot be integrated in one direction forever, and correspondingly, the laser light chirp cannot increase in frequency forever.

The voltage integration stage 308 takes the alternating positive and negative voltage from the positive negative chirp direction select switch 306 block, and generates a positive or negative voltage ramp. The ramp voltage from the integration stage 308 is applied to the transconductance stage 310 to produce a ramped current to drive the laser light source 312, i.e., a ramped laser light source current drive. In this embodiment, the frequency of the laser light produced by the laser light source 312 is proportional to the current that is driving the laser light source 312. Thus, the laser light frequency changes with the ramped current, producing the laser light chirp.

Figure 4:
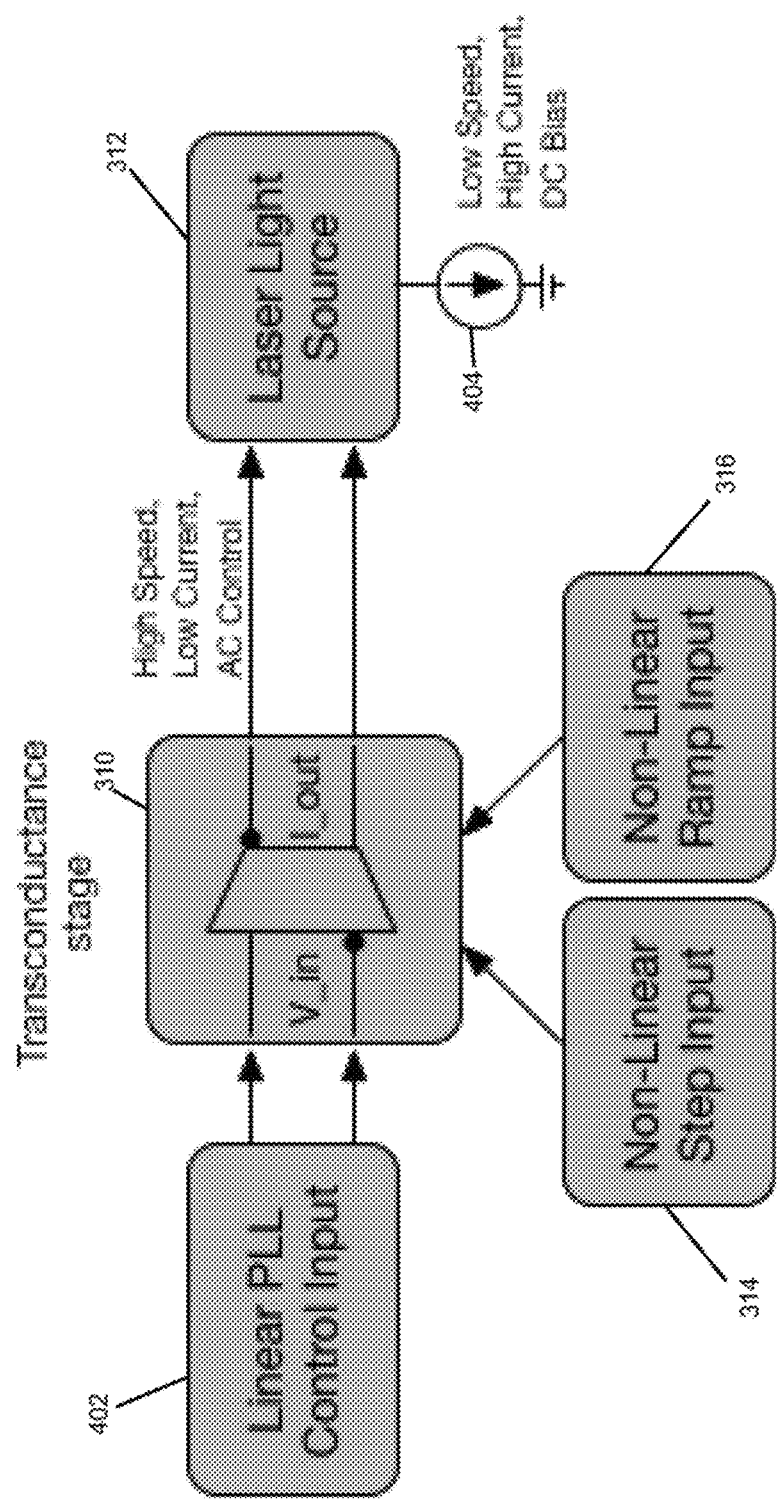
FIG. 4 illustrates separate control circuits for the low-speed, high current DC bias and high speed, low current AC control of the laser light source in accordance with embodiments of the present disclosure.

FIG. 4 illustrates separate control circuits for the low-speed, high current DC bias and high speed, low current AC control of the laser light source 312 in accordance with embodiments of the present disclosure. In practice, changing the ramp direction creates a large nonlinearity in the control loop, and the PLL in some embodiments loses its lock. The PLL starts trying to re-lock, and after a period of time the lock is re-established. How long it takes to re-lock is dependent on several different factors, and the amount of time required can be reduced by applying non-linear inputs 314, 316 to laser light source 312 during the re-locking period. This is why the transconductance stage 310 in some embodiments is designed to take multiple high frequency discrete inputs and sum them together into a single output current (see FIGS. 5A-5I).

The laser light source 312 is illuminated using two separate control circuits. One circuit is for the low speed high current DC laser bias, and the second section is for the high-speed AC chirp generation control. This configuration is advantageous because the current state-of-the-art laser driver uses only one circuit to illuminate the laser light source. Having separate sections to control DC and the AC signals allows each circuit to be optimized for its particular mode of operation which results in improved performance.

In one embodiment the circuit for the low-speed, high current DC bias is implemented as a controlled current power supply 404, such as a current source or a current sink. In practice, a controlled current power supply 404 can be implemented using current mirroring with power MOSFETs, or bipolar transistors, etc.

In one embodiment the circuit for the high-speed, low current AC control includes linear PLL control input 402 and the transconductance stage 310 (see FIGS. 2, 3, 5B and 5I).

Figure 5A:
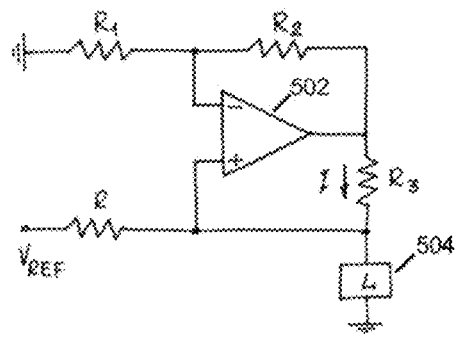
FIG. 5A illustrates a Howland current pump.

FIG. 5A illustrates a Howland current pump. The high-speed control circuit is based on the Howland current pump circuit, but there are some differences that are new. The original Howland Current Pump is a single ended circuit with only one input, and the single ended output is DC coupled to the load 504. In the version shown, an op amp (operational amplifier) 502 drives a constant current, related to the reference voltage, through a resistor R3 and through the grounded load 504 regardless of load impedance. Matching all of the resistors in the Howland current pump compensates for the parasitic currents resulting from the imperfect nature of the op amp 502 (i.e., it is not an infinite amplification and does not have infinite input impedance and truly zero output impedance), so that the op amp 502 and resistors act as a negative impedance converter.

Figure 5B:
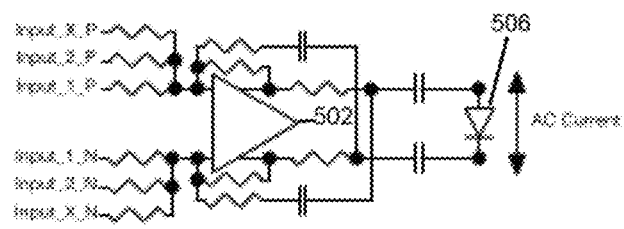
FIG. 5B illustrates a multi-input, fully differential current pump, which is inspired by the Howland current pump of FIG. 5A and developed as a transconductance stage in FIGS. 5C-5I in accordance with embodiments of the present disclosure.

FIG. 5B illustrates a multi-input, fully differential current pump, which is inspired by the Howland current pump of FIG. 5A and developed as a transconductance stage in FIGS. 5C-5I in accordance with embodiments of the present disclosure. To meet the design requirements for this circuit, the basic Howland current pump has been changed to accept multiple inputs and to drive an AC load. Here, the load is a laser diode 506, as an embodiment of the laser light source 204 (see FIGS. 2-4). Low-speed, high current DC bias, for example in the form of the controlled current power supply 404, is not shown in FIG. 5B but is readily added (see FIG. 4), with the DC bias blocked by the capacitors in the circuit in FIG. 5B or variations thereof.

The purpose of the gm or transconductance stage is to generate an output current that is a function of the input voltage, where the factor gm gives the current to voltage ratio.

$$gm = I_{out}/V_{in}$$

This is accomplished with an op amp 502 based transconductance stage, but it requires some modifications from the common op amp gain stage as described below.

Figure 5C:
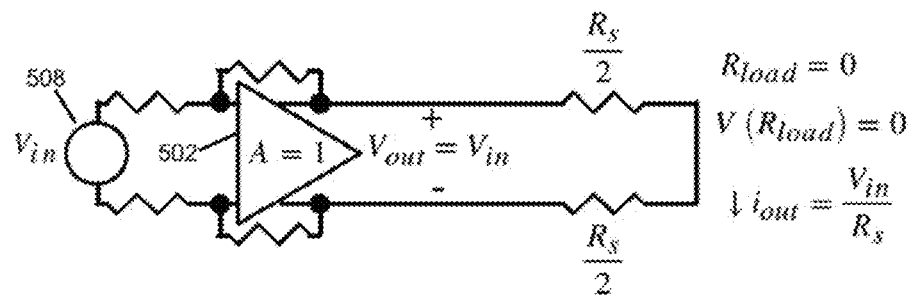
FIG. 5C is an illustration of an op amp transconductance stage with a zero ohm load.

FIG. 5C is an illustration of an op amp transconductance stage with a zero ohm load. A fully differential op amp 502 driving a load resistance $R_s$ will supply a load current as a function of its input voltage $V_{in}$, its circuit gain A, and the fixed load resistance $R_s$ where $I_{out}=V_{in}/R_s$. But if an unknown load is added to the circuit (see FIG. 5D), the extra voltage drop across the new load reduces the total amount of current flowing from the op amp 502.

Figure 5D:
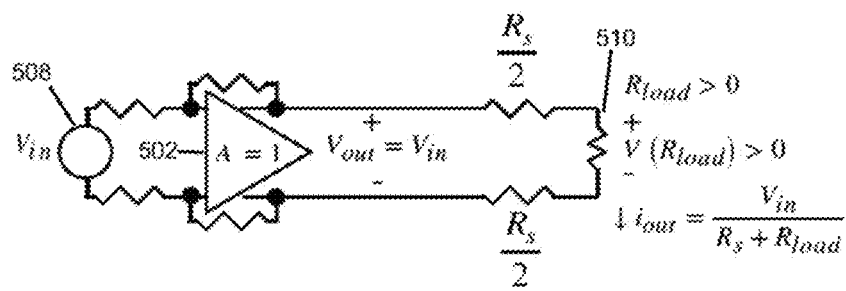
FIG. 5D is an illustration of an op amp transconductance stage with an unknown load.

FIG. 5D is an illustration of an op amp transconductance stage with an unknown load 510, in this example a resistor with nonzero resistance. The extra load voltage drop can be compensated for by increasing the input voltage by the exact amount that is dropped across the load resistance (see FIG. 5E), making the op amp output voltage $V_{out}=V_{in}+V(R_{load})$. Because is dropped across $R_{load}$, this leaves the remaining $V_{in}$ to be dropped across the sense resistors $R_s$. This means that the current through the sense resistors is $I(R_s)=V_{in}/R_s$, because the sense resistors are in series giving them equal current, resulting in $i_{out}=V_{in}/R_s$.

Figure 5E:
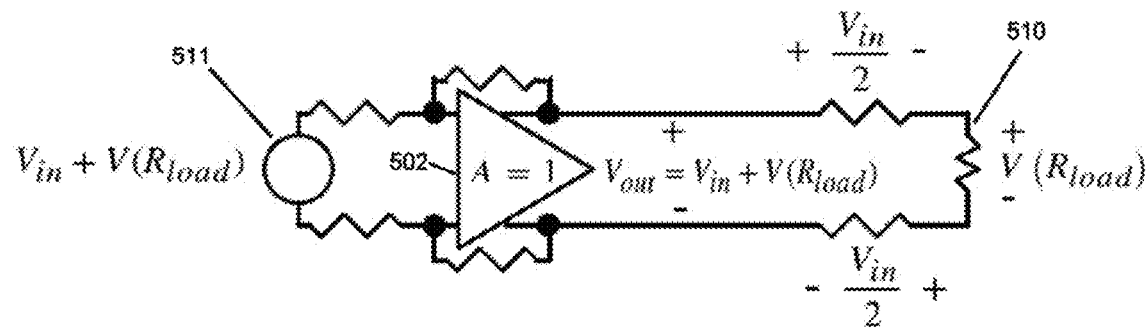
FIG. 5E is an illustration of an op amp transconductance stage with a compensated output voltage.

FIG. 5E is an illustration of an op amp transconductance stage with a compensated output voltage. A common op amp configuration is to perform summing operations as in FIG. 5F. In this configuration, $V_{in}$ and $V(R_{load})$ voltage inputs are summed together as input voltage source 511 to generate the compensated output voltage that ensures $i_{out}=V_{in}/R_s$.

Figure 5F:
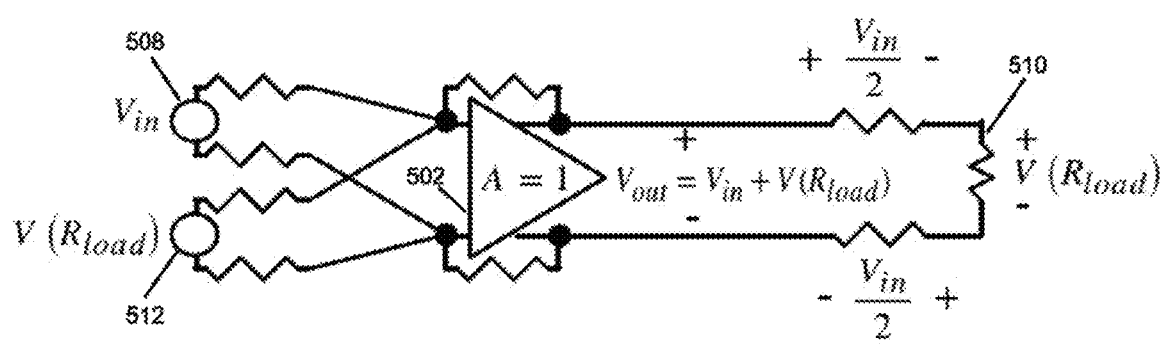
FIG. 5F is an illustration of an op amp transconductance stage with multiple voltage inputs that are summed together to generate a compensated output voltage.

FIG. 5F is an illustration of an op amp transconductance stage with multiple voltage inputs 508, 512 (i.e., input voltage sources) that are summed together to generate a compensated output voltage. The circuit in FIG. 5F would require a separate voltage source to replicate V(Rload), but this is not necessary if the circuit is arranged to positively feedback $V(R_{load})$ from the output to the input as a summed input (see FIG. 5G). However, it is important that the amount of positive feedback is never greater than the negative feedback because that will lead to instability.

Figure 5G:
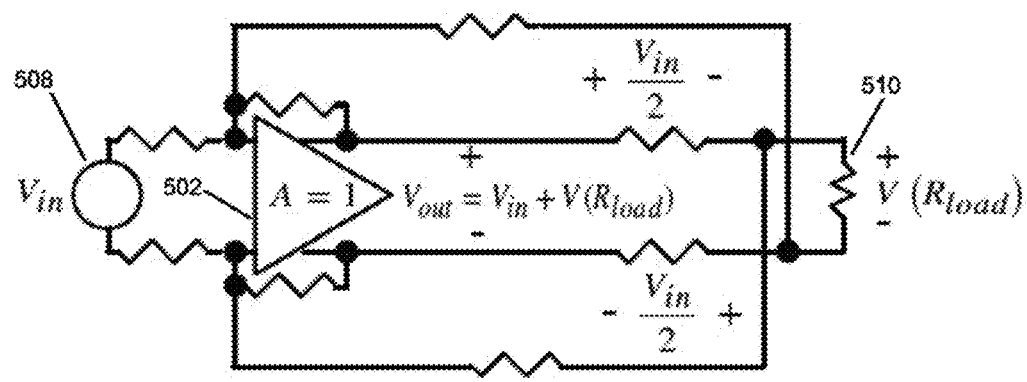
FIG. 5G is an illustration of an op amp transconductance stage with compensated output voltage.

FIG. 5G is an illustration of an op amp transconductance stage with compensated output voltage. An added benefit to this op amp 502 based architecture is that several different input sources can be summed together. An input voltage source 508 is shown in FIG. 5G. Various sources of control voltages can be driven into the gm stage, and each one of those inputs can be given their own value of transconductance (see FIG. 5H) as a function of its individual voltage gain as determined by its ratio of feedback vs. input impedance.

This property can be put to use in a wide variety of configurations from summing several independent sources, or summing the proportional, integral, and differential control voltages from a PID controller, or in a hybrid system, including embodiments of the Laser PLL circuit where the PLL control input is summed with other types of step and ramp inputs in to improve locking time performance and to correct for instantaneous phase offset.

Figure 5H:
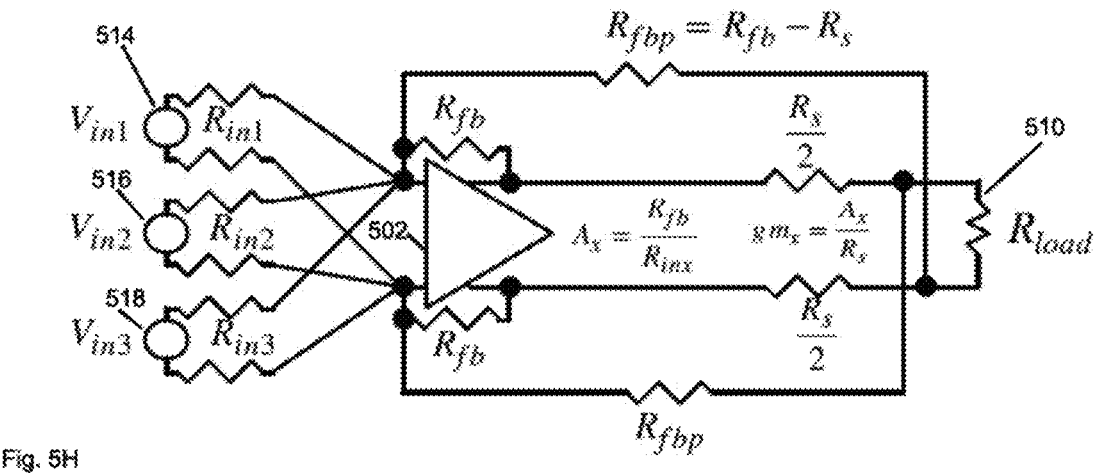
FIG. 5H is an illustration of an op amp transconductance stage summing three independent voltage sources each one having its own value of voltage to current gain, gm.

FIG. 5H is an illustration of an op amp transconductance stage summing three independent voltage sources 514, 516, 518, each one having its own value of voltage to current gain, gm. Forsome embodiments of the laser PLL, the gm stage output should have zero DC current flowing to the laser diode. AC coupling the gm stage could block the DC output, but this solution will break because there is always some internal offset in the op amp 502 caused by manufacturing tolerances. To allow fora DC block on the gm stage output that will not cause the op amp's internal DC offset to break the control loop, the circuit should make the positive feedback go to infinity as the frequency goes to DC. This is accomplished by adding a DC blocking capacitor in the positive feedback path as shown in FIG. 5I.

Figure 5I:
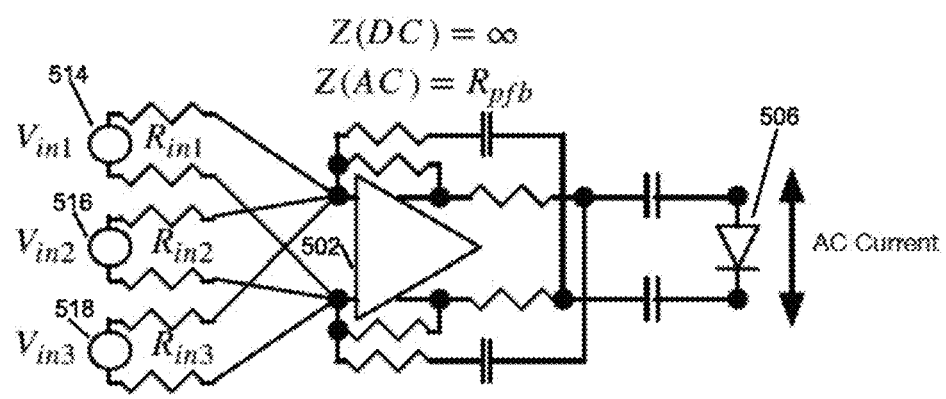
FIG. 5I is an illustration of an op amp transconductance stage with DC block on the output, and DC blocking on the positive feedback.

FIG. 5I is an illustration of an op amp transconductance stage with DC block on the output, and DC blocking on the positive feedback. DC blocking is done with capacitors, allowing AC signaling to reach the laser diode. The circuit is fully differential, i.e., differential input, differential output, and DC blocking is done with capacitors on both upper and lower paths of output and feedback. Referring back to FIG. 5B, various further embodiments of a transconductance stage are readily developed for any number of inputs.

Figure 6:
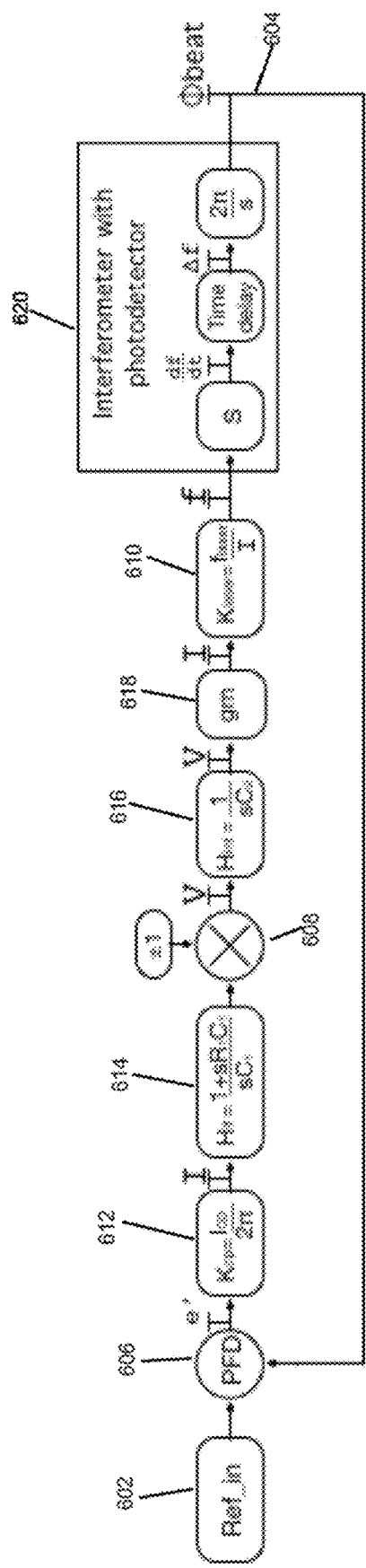
FIG. 6 illustrates the control loop as a second-order system in accordance with embodiments of the present disclosure.

FIG. 6 illustrates the control loop as a second-order system in accordance with embodiments of the present disclosure. Each of the electronic circuit, optical and electro-optical components in the closed loop electro-optical system of FIGS. 2 and 3 has a corresponding model in the second-order system shown in FIG. 6. The reference input 602 provides the reference frequency as input to the system, in FIG. 2. A phase frequency detector model 606 provides a model for the phase frequency detector 318 in FIG. 3. A charge pump model 612 models the charge pump 320. A loop filter model 614 models the loop filter 322. The chirp direction select switch 306 of FIG. 3 is modeled by a multiplier 608 that has multiplication by plus or minus one. A voltage integration model 616 models the voltage integration stage 308. The transconductance stage 310 is modeled by the gm model 618. A laser light frequency response model 610 models the behavior of the laser light source 312. An interferometer with photodetector model 620 models the behavior of the interferometer 206 and the photodetector 208. The control loop is closed by feedback of the beat frequency 604 as a variable to the phase frequency detector model 606, for comparison of the beat frequency to the reference frequency.

In its simplest configuration, where the non-linear inputs are kept at zero, the control loop is a second order system and the above given block diagram can be used to derive the transfer function H(s) as follows:

The standard PLL blocks are the Phase Frequency Detector (PFD), the charge pump, and the loop filter.

The PFD detects the phase values of the reference and beat frequencies, and its output is an error value showing the difference between the two phases.

$$\Phi_{error} = \Phi_{reference} - \Phi_{out}$$

The charge pump takes the PFD phase error value, and converts the phase error into current. The proportionality constant for relating phase error to charge pump current is called $K_{cp}$ and the transfer function for phase error to charge pump current is below. For every $2\pi$ amount of phase error, then $I_{cp}$ amount of current will be added to or subtracted from the loop filter.

$$K_{cp} = \frac{I_{cp}}{2\pi}$$

The loop filter has a transfer function that integrates the current output from the charge pump into a voltage. The loop filter here is a circuit of one resistor and one capacitor, $R_1$ and $C_1$ from FIG. 6, leading to the loop filter transfer function below.

$$H_{lf} = \frac{1 + sR_1C_1}{sC_1}$$

Once the PLL is locked in steady state, the output voltage from $H_{lf}$ will be a constant level DC voltage. To switch the chirp direction requires reversing the PLL control voltage polarity, and the positive/negative chirp select multiplexer allows the polarity to be switched instantaneously for the model.

The positive or negative DC voltage coming from the Positive/Negative Chirp Select block is converted into a voltage ramp by the integration stage. The resistance and capacitance values. $R_2$ and $C_2$ in FIG. 6, set the slope of the ramp according to the following.

$$\frac{dV_{out}}{dt} = \frac{V_{in}}{sR_2C_2}$$

The transconductance stage takes the voltage output from the integration stage, and transforms it to a current output as a function of its transconductance value gm below.

$$gm = \frac{dI_{out}}{dV_{out}}$$

The laser light source converts the input current (I) into a frequency output (f). Different values of input current will produce different values of light frequency (this is the same as saying different wavelengths of light). The laser light frequency versus input current is given as $K_{laser}$ below.

$$f = K_{laser}I$$

The optical interferometer splits the light into 2 different length paths, and then recombines the light into a single path. Any instantaneous difference in frequency of the two recombined light signals shows up as a beat frequency that can be detected by a photodetector, in one embodiment a photodiode followed by a TIA (see description of FIG. 2). The photodetector, for example the photodiode and TIA, detects the beat frequency from the combined light paths, and feeds the beat frequency back to the PLL block. In the block diagram of the interferometer with photodetector 620 from FIG. 6, the s parameter from the interferometer pulls out the df/dt (i.e., the ramp rate of laser frequency) from the laser frequency f, and the time delay converts it to a beat frequency value.

Using the control loop block diagram from FIG. 6, the control loop formula is derived as follows. The R, C, and gm values are selected to ensure loop stability. The forward loop gain is given as G(s), and the closed loop transfer function is given as H(s).

$$G(s) = K_{cp}H_{lf} * (\pm 1) * H_{int}gmK_{laser} * TimeDelay * 2\pi$$

$$G(s) = I_{cp}\left(\pm \frac{1 + sR_1C_1}{sC_1R_2C_2}\right)gmK_{laser} * TimeDelay$$

$$H(s) = \frac{G(s)}{1 + G(s)} = \frac{I_{cp}\left(\pm \frac{1 + sR_1C_1}{sC_1R_2C_2}\right)gmK_{laser} * TimeDelay}{I_{cp}\left(\pm 1 + \frac{1 + sR_1C_1}{sC_1R_2C_2}\right)gmK_{laser} * TimeDelay}$$

$$H(s) = \frac{1 + sR_1C_1}{s^2\left(\frac{C_1R_2C_2}{I_{cp}gmK_{laser} * TimeDelay}\right) + sR_1C_1 + 1}$$

A well understood control theory transfer function is given below for H(s) where the value $\omega_n$ is the natural frequency of the circuit and $\zeta$ is the damping ratio. The transfer function above for if (s) has the same structure as below, and using this similarity leads to calculating design variables to ensure loop stability. The factors of $\omega_n$, $K_{laser}$, and TimeDelay are driven by design requirements, and this leaves $I_{cp}$, gm, and $R_1$, $C_1$, $R_2$, and $C_2$ as the adjustable variables. Substituting leads to solving for $\omega_n$ and $\zeta$.

$$H(s) = \frac{1 + 2\zeta \frac{s}{\omega_n}}{s^2 \frac{1}{\omega_n^2} + s\zeta \frac{1}{\omega_n} + 1}$$

$$\omega_n = \sqrt{\frac{I_{cp} g m K_{laser} TimeDelay}{C_1 R_2 C_2}}$$

$$\zeta = \frac{\omega_n}{2} R_1 C_1$$

From H(s), the second order loop control factors $\omega$ and $\zeta$ can be derived and designed for, and loop stability can be ensured across a wide variety of K_laser factors and time delays.

Having control of the loop stability factors enables dynamic control of the linear chirp ramp rate. Having dynamic control of the linear chirp ramp rate is a big innovation over the current method which operates with only one fixed ramp rate. Having control of the linear chirp ramp rate allows the LiDAR sensing system to optimize itself to the distance that is getting measured. Instead of pushing the photodetector circuit to operate at very high frequencies, the ramp rate can be configured to enable the use of a low bandwidth photodetector circuit even when the measured object is very far away.

Figure 7:
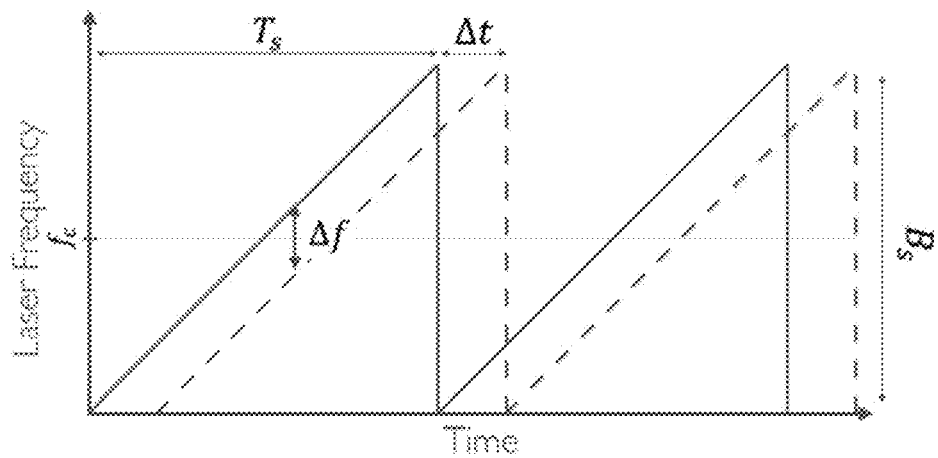
FIG. 7 depicts a sawtooth modulation scheme.

FIG. 7 depicts a sawtooth modulation scheme. Laser frequency is ramped up (increasing frequency) over time, then returned to an initial or baseline frequency, with the ramp up and return repeating in a series over time. The sawtooth modulation scheme is depicted in FIG. 7 for reference, and comparison with the triangle modulation scheme depicted in FIG. 8.

Figure 8:
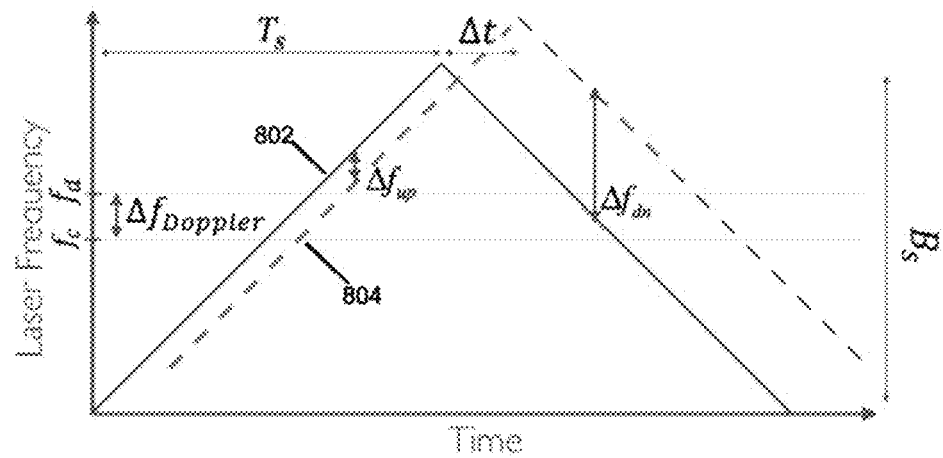
FIG. 8 depicts a triangle modulation scheme in accordance with embodiments of the present disclosure.

FIG. 8 depicts a triangle modulation scheme in accordance with embodiments of the present disclosure. Laser frequency is ramped up (increasing frequency), then ramped down (decreasing frequency) over time, with the ramp up and ramp down repeating in a series over time. Ramp rate of the chirp, i.e., the slope of the ramp or the rate of frequency change of the laser light, whether up or down, is phase locked to the reference frequency. The solid line 802 is for laser light traveling through the shorter fiber optic path internal to an interferometer 206, the dotted line 804 is for laser light traveling through the longer optical path of the interferometer 206 with a constant time delay. The delta_F is the beat frequency and the different ramp rate slopes result in different beat frequencies. Locking the beat to an external reference ensures that delta_F is constant and that the ramp rate df/dt is linear.

Tuning the ramp rate, by varying the reference frequency, can be used in various embodiments of LIDAR systems. For example, a steep ramp or rapid change of frequency of laser light could be used for finer resolution of distance (i.e., range) but may run out of headroom for more distant objects to be sensed. A shallower ramp or slower rate of change of frequency of laser light could be used for lower resolution but more distant objects.

Various embodiments described herein have potential commercial application in any sensing market, such as, but not limited to, transportation, manufacturing, metrology, medical, and security, is a potential commercial target for this invention. For example, in the automotive industry, such a device can assist with spatial awareness for automated driver assist systems, or self-driving vehicles.

Figure 9A:
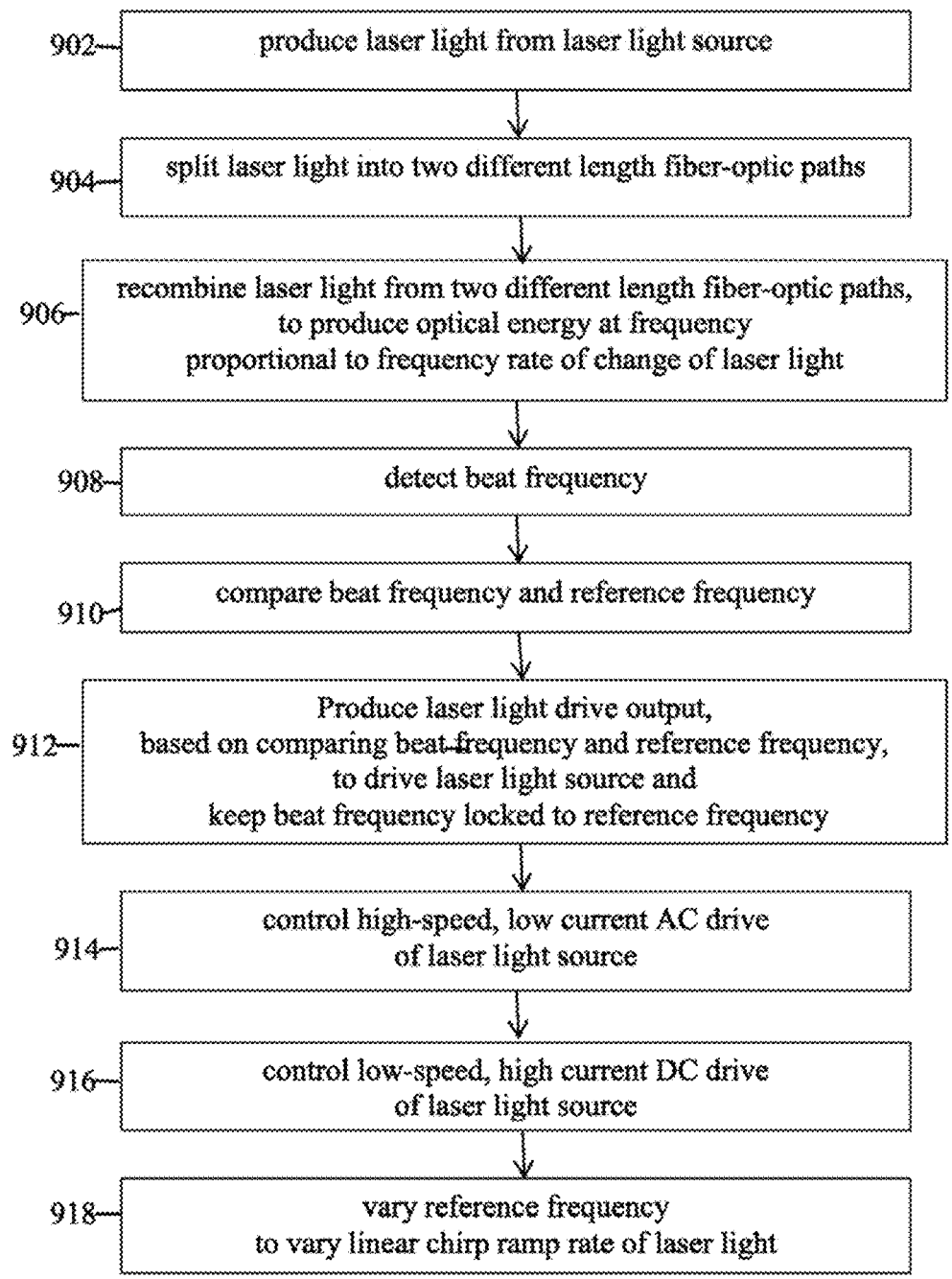
FIG. 9A is a flow diagram of a method of generating a linear phase chirp from a laser light source, which can be practiced by embodiments of the closed loop electro-optical system of the present disclosure.

FIG. 9A is a flow diagram of a method of generating a linear phase chirp from a laser light source, which can be practiced by embodiments of the closed loop electro-optical system of the present disclosure. In an action 902, laser light is produced from a laser light source. A laser diode is a suitable laser light source for some embodiments. A laser light source that has laser light of a frequency related to the current driving the laser light source is a suitable laser light source for some embodiments.

In an action 904, laser light from the laser light source is split into two fiber-optic paths of different lengths. An interferometer, as shown in FIG. 2 is a suitable component for splitting the laser light into two such paths.

In an action 906, laser light from the two different lengths fiber-optic paths is recombined to produce optical energy at a beat frequency proportional to the frequency rate of change of the laser light. The interferometer shown in FIG. 2 is a suitable component for performing this recombination.

In an action 908, the beat frequency is detected. A photodetector is a suitable component for detecting the beat frequency.

In an action 910, the beat frequency and a reference frequency are compared. FIG. 3 shows an example phase frequency detector in a PLL block as a suitable component for comparing the beat frequency and the reference frequency.

In an action 912, a laser light drive output is produced, based on comparing the beat frequency and the reference frequency, to drive the laser light source and keep the beat frequency locked to the reference frequency. Circuit(s) shown and described with reference to FIGS. 2 and 3 are suitable for producing the laser light drive output.

In an action 914, high speed, low current AC drive of the laser light source is controlled. The circuit shown and described with reference to FIGS. 2 through 5I, and variations thereof, are suitable for various embodiments to control the AC drive of the laser light source.

In an action 916, the low-speed, high current DC drive of the laser light source is controlled. The controlled current power supply shown and described with reference to FIG. 4 is a suitable component for controlling the DC drive of the laser light source.

In an action 918, the reference frequency is varied, to vary the linear chirp ramp rate of the laser light. With the ramp rate of the linear chirp of the laser light locked to the reference frequency by the closed loop electro-optical system shown and described with reference to FIGS. 1 through 6, a suitable system is obtained for varying the linear chirp ramp rate according to the reference frequency.

Figure 9B:
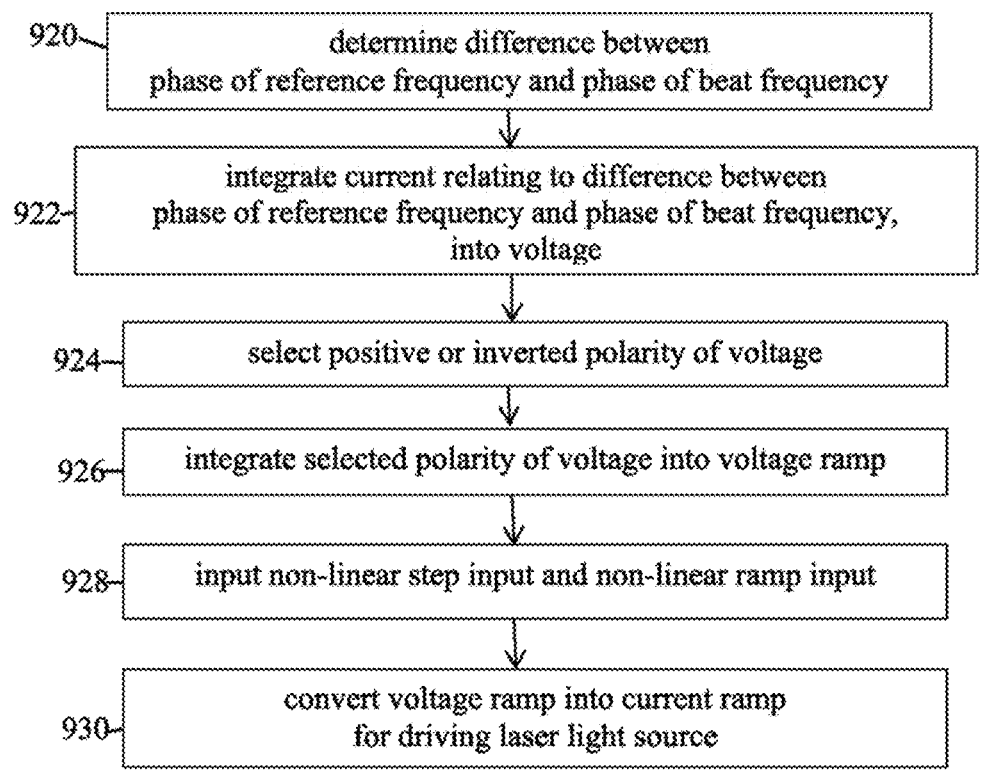
FIG. 9B is a flow diagram of a further method for generating a linear phase chirp from a laser light source, which can be practiced by embodiments of the closed-loop electro-optical system of the present disclosure.

FIG. 9B is a flow diagram of a further method for generating a linear phase chirp from a laser light source, which can be practiced by embodiments of the closed-loop electro-optical system of the present disclosure. In an action 920, the difference between the phase of the reference frequency and the phase of the beat frequency is determined. The phase frequency detector shown and described with reference to FIG. 3 is a suitable component for determining this difference.

In an action 922, the current relating to the difference between the phase of the reference frequency and the phase of the beat frequency is integrated into a voltage. The loop filter, shown and described in the PLL block with reference to FIG. 3 is a suitable component for such integration.

In an action 924, the positive or inverted polarity of the voltage is selected. The chirp direction select switch 306 shown and described with reference to FIG. 3 is a suitable component for this selection.

In an action 926, the selected polarity of voltage is integrated into a voltage ramp. The voltage integration stage shown and described with reference to FIG. 3 is a suitable component for this integration.

In an action 928, a non-linear step input and a non-linear ramp input are input. FIGS. 3 through 5I show circuits suitable for such input.

In an action 930, the voltage ramp is converted into a current ramp for driving the laser light source. The transconductance stage shown and described with reference to FIGS. 3 through 5I is a suitable component for the input in the action 928, and the conversion into the current ramp in the action 930.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Reference throughout this specification to "one embodiment" or "an embodiment" means that a particular feature, structure, or characteristic described in connection with the embodiments included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. An electro-optical system, comprising:
   a laser drive electronic circuit arranged to receive a reference frequency as input and a beat frequency as feedback and generate a drive output based on a phase difference between the reference frequency and the beat frequency, wherein the laser drive electronic circuit comprises:
      a phase frequency detector;
      a charge pump;
      a loop filter;
      a chirp direction select switch; and
      an integrating stage;
   a laser light source arranged to receive the drive output and generate laser light; and
   an optical interferometer coupled to the laser light to generate optical energy at the beat frequency, proportional to rate of frequency change of the laser light, wherein the laser drive electronic circuit, the laser light source and the optical interferometer with the feedback form a closed loop.

2. An electro-optical system, comprising:
   a laser drive electronic circuit arranged to receive a reference frequency as input and a beat frequency as feedback and generate a drive output based on a phase difference between the reference frequency and the beat frequency wherein the laser drive electronic circuit comprises:
      a transconductance stage having one or more non-linear inputs to reduce loop locking time when chirp direction is changed;
   a laser light source arranged to receive the drive output and generate laser light; and
   an optical interferometer coupled to the laser light to generate optical energy at the beat frequency, proportional to rate of frequency change of the laser light, wherein the laser drive electronic circuit, the laser light source and the optical interferometer with the feedback form a closed loop.

3. An electro-optical system, comprising:
   a laser drive electronic circuit arranged to receive a reference frequency as input and a beat frequency as feedback and generate a drive output based on a phase difference between the reference frequency and the beat frequency, wherein the laser drive electronic circuit comprises:
      a phase locked loop (PLL) block to generate a direct current (DC) voltage in response to the phase difference between the reference frequency and the beat frequency;

a positive to negative chirp selector to control positive or negative DC voltage output of the PLL block, using output of the PLL block and inverted output of the PLL block;

a voltage integration stage to convert DC voltage output of the positive to negative chirp selector to a voltage ramp output; and a transconductance stage to convert the voltage ramp output to output current as the drive output of the laser drive electronic circuit;

a laser light source arranged to receive the drive output and generate laser light; and an optical interferometer coupled to the laser light to generate optical energy at the beat frequency, proportional to rate of frequency change of the laser light, wherein the laser drive electronic circuit, the laser light source and the optical interferometer with the feedback form a closed loop.

4. An electro-optical system for generating a linear phase chirp from a laser light source, comprising:

a laser light source arranged to receive a laser light drive and generate laser light;

an optical interferometer arranged to receive a portion of the laser light and generate optical energy at a beat frequency proportional to laser light frequency rate of change;

a photodetector arranged to receive at least a portion of the optical energy at the beat frequency and generate a signal that indicates the beat frequency; and a laser drive electronic circuit arranged to receive a reference frequency as input and the signal that indicates the beat frequency as closed loop feedback, compare the beat frequency with the reference frequency and generate the laser light drive so as to correct the laser light drive to keep the beat frequency locked to the reference frequency, wherein the laser drive electronic circuit comprises:

a phase frequency detector to determine an error value showing difference between phases of the reference frequency and the signal that indicates the beat frequency;

a charge pump to convert the error value to current;

a loop filter to integrate the current from the charge pump into a voltage;

a chirp direction select switch to select positive or inverted polarity of the voltage from the loop filter; and an integrating stage to convert the selected positive or inverted polarity of the voltage from the loop filter into a voltage ramp.

5. An electro-optical system for generating a linear phase chirp from a laser light source, comprising:

a laser light source arranged to receive a laser light drive and generate laser light; and an optical interferometer arranged to receive a portion of the laser light and generate optical energy at a beat frequency proportional to laser light frequency rate of change;

a photodetector arranged to receive at least a portion of the optical energy at the beat frequency and generate a signal that indicates the beat frequency; and a laser drive electronic circuit arranged to receive a reference frequency as input and the signal that indicates the beat frequency as closed loop feedback, compare the beat frequency with the reference frequency and generate the laser light drive so as to correct the laser light drive to keep the beat frequency locked to the reference frequency, wherein the laser drive electronic circuit comprises:

a transconductance stage to convert a voltage ramp to a current output as the laser light drive; and the transconductance stage having a non-linear step input and a non-linear ramp input.

6. An electro-optical system for generating a linear phase chirp from a laser light source, comprising:

a laser light source arranged to receive a laser light drive and generate laser light; and an optical interferometer arranged to receive a portion of the laser light and generate optical energy at a beat frequency proportional to laser light frequency rate of change;

a photodetector arranged to receive at least a portion of the optical energy at the beat frequency and generate a signal that indicates the beat frequency; and a laser drive electronic circuit arranged to receive a reference frequency as input and the signal that indicates the beat frequency as closed loop feedback, compare the beat frequency with the reference frequency and generate the laser light drive so as to correct the laser light drive to keep the beat frequency locked to the reference frequency, wherein the laser drive electronic circuit comprises:

a phase locked loop (PLL) block to generate a single ended DC voltage in response to a phase error between the reference frequency and the beat frequency;

a single ended to differential transform stage to convert the single ended DC voltage to a balanced differential drive signal;

a positive to negative chirp selector to switch between positive and negative DC voltage output, using the balanced differential drive signal;

a differential voltage integration stage to convert the positive or negative DC voltage output of the PLL block to a positive or negative slope voltage ramp output; and a differential transconductance stage to convert the positive or negative voltage slope ramp output to output current as the laser light drive.

7. A method of generating a linear phase chirp from a laser light source, comprising:

producing laser light from a laser light source;

producing, from an optical interferometer, optical energy at a beat frequency proportional to frequency rate of change of the laser light;

comparing the beat frequency and a reference frequency;

producing a laser light drive output that drives the laser light source to keep the beat frequency locked to the reference frequency, based on the comparing;

determining a difference between phase of the reference frequency and phase of the beat frequency;

integrating a current relating to the difference between the phase of the reference frequency and the phase of the beat frequency, into a voltage;

selecting positive or inverted polarity of the voltage; and integrating the selected polarity of the voltage into a voltage ramp, wherein the producing the laser light drive output is based on the voltage ramp.

8. A method of generating a linear phase chirp from a laser light source, comprising:

producing laser light from a laser light source;

producing, from an optical interferometer, optical energy at a beat frequency proportional to frequency rate of change of the laser light;

comparing the beat frequency and a reference frequency;

inputting a non-linear step input and a non-linear ramp input to a transconductance stage to produce a laser light drive output; and producing the laser light drive output that drives the laser light source to keep the beat frequency locked to the reference frequency, based on the comparing.

9. The electro-optical system of claim 2, further comprising:

a photodetector coupled to the optical energy at the beat frequency to generate a signal representing the beat frequency, for input to the laser drive electronic circuit.

10. The electro-optical system of claim 2, wherein the laser light comprises a linear phase chirp.

11. The electro-optical system of claim 2, wherein the optical interferometer is to couple the laser light into two different length paths and recombine light from each of the two different length paths to generate the optical energy at the beat frequency.

12. The electro-optical system for generating a linear phase chirp from a laser light source of claim 5, further comprising:

a low-speed, high current, direct current (DC) bias circuit to control average direct current drive of the laser light source, distinct from high-speed, low current, alternating current (AC) control of the laser light source by the laser drive electronic circuit with the closed loop feedback.

13. The electro-optical system for generating a linear phase chirp from a laser light source of claim 4, wherein the optical interferometer is to split the portion of the laser light into two different length fiber-optic paths and recombine light from each of the two different length fiber-optic paths to generate the optical energy at the beat frequency.

14. The method of generating a linear phase chirp from a laser light source of claim 8, further comprising:

detecting the beat frequency, with a photodetector, wherein the comparing the beat frequency and the reference frequency is based on output of the photodetector.

15. The method of generating a linear phase chirp from a laser light source of claim 8, further comprising:

controlling high speed, low current alternating current (AC) drive of the laser light source for the beat frequency locked to the reference frequency; and controlling low-speed, high current direct current (DC) drive of the laser light source through a DC bias circuit.

16. The method of generating a linear phase chirp from a laser light source of claim 8, further comprising:

varying the reference frequency to vary a linear chirp ramp rate of the laser light.

17. The method of generating a linear phase chirp from a laser light source of claim 8, wherein the producing, from the optical interferometer, the optical energy comprises:

coupling the laser light, in parallel, into a first length fiber-optic path and a second length fiber-optic path; and combining the laser light from the first length fiber-optic path and the laser light from the second length fiber-optic path to produce the optical energy at the beat frequency.

* * * * *